United States Patent
Bender et al.

(10) Patent No.: US 11,558,208 B2
(45) Date of Patent: Jan. 17, 2023

(54) PROXIMITY BASED AUDIO COLLABORATION

(71) Applicant: INTERNATIONAL BUSINESS MACHINES CORPORATION, Armonk, NY (US)

(72) Inventors: Michael Bender, Rye Brook, NY (US); Craig M. Trim, Ventura, CA (US); Milton A. Bonilla, Carmel, NY (US); Tamer Nassar, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 664 days.

(21) Appl. No.: 16/580,499

(22) Filed: Sep. 24, 2019

(65) Prior Publication Data
US 2021/0091969 A1    Mar. 25, 2021

(51) Int. Cl.
*H04L 12/18*    (2006.01)
*G10L 15/18*    (2013.01)
(Continued)

(52) U.S. Cl.
CPC ........ *H04L 12/1818* (2013.01); *G06F 16/685* (2019.01); *G06F 16/686* (2019.01);
(Continued)

(58) Field of Classification Search
CPC ............. H04L 12/1818; H04L 12/1831; H04L 12/1845; H04L 67/52; H04W 4/021;
(Continued)

(56) References Cited

U.S. PATENT DOCUMENTS 7,571,212 B2 * 8/2009 Reynolds ............ H04L 12/1822
709/206
9,491,237 B1 * 11/2016 Garg ..................... H04W 4/021
(Continued)

FOREIGN PATENT DOCUMENTS

CN    102723078 A  * 10/2012
CN    105138670 A  * 12/2015 ........... G06F 16/951

OTHER PUBLICATIONS

Van Zandt, "Studies show open offices are distraction magnets. But there are ways to make it work.", Washington Business Journal, May 17, 2018, 8 pages.
(Continued)

*Primary Examiner* — David R Lazaro
*Assistant Examiner* — Robert A Shaw
(74) *Attorney, Agent, or Firm* — Brian Restauro; Andrew D. Wright; Calderon Safran & Cole, P.C.

(57) ABSTRACT

A method includes: defining, by a computer device, an audio collaborative environment; defining, by the computer device, an access control of the audio collaborative environment, wherein the access control includes a geofence; receiving, by the computer device, a request from at least one user device to connect to the audio collaborative environment; determining, by the computer device, the at least one user device satisfies the access control; connecting, by the computer device, the at least one user device to an audio channel of the audio collaborative environment; recording, by the computer device, audio data transmitted on the audio channel by the at least one user device; storing, by the computer device, the audio data in a record; tagging, by the computer device, respective portions of the audio data in the record; and presenting one of the respective portions of the audio data to a user based on the tagging.

20 Claims, 6 Drawing Sheets

(51) Int. Cl.

| | |
|---|---|
| *H04W 4/021* | (2018.01) |
| *H04W 4/029* | (2018.01) |
| *G06F 40/30* | (2020.01) |
| *G06F 16/683* | (2019.01) |
| *G06F 16/68* | (2019.01) |
| *G10L 25/63* | (2013.01) |

(52) U.S. Cl.
CPC .......... *G06F 40/30* (2020.01); *G10L 15/1815* (2013.01); *H04W 4/021* (2013.01); *H04W 4/029* (2018.02); *G10L 25/63* (2013.01); *H04L 12/1831* (2013.01)

(58) Field of Classification Search
CPC ..... H04W 4/029; H04W 12/08; H04W 12/64; H04M 2203/303; H04M 3/56; H04M 3/42221; G06F 16/685; G06F 16/686; G06F 40/30; G06F 21/32; G10L 15/1815; G10L 25/63
See application file for complete search history.

(56) References Cited

U.S. PATENT DOCUMENTS

| | | | |
|---|---|---|---|
| 9,633,008 | B1 | 4/2017 | Brand et al. |
| 2004/0049539 | A1* | 3/2004 | Reynolds ............ H04L 12/1822 709/205 |
| 2010/0121921 | A1 | 5/2010 | Dunton |
| 2010/0216402 | A1 | 8/2010 | Appleby et al. |
| 2012/0284638 | A1 | 11/2012 | Cutler et al. |
| 2013/0091205 | A1* | 4/2013 | Kotler .................. G06Q 10/101 709/204 |
| 2014/0045472 | A1* | 2/2014 | Sharma ............... H04L 12/1818 455/416 |
| 2015/0149540 | A1* | 5/2015 | Barker ................ H04L 12/1831 709/204 |
| 2015/0207828 | A1* | 7/2015 | Buddenbaum ...... H04L 65/1093 709/205 |
| 2016/0099984 | A1* | 4/2016 | Karagiannis ........ H04L 12/1822 709/204 |
| 2016/0142787 | A1* | 5/2016 | Mohamed ............... G06F 16/48 725/53 |
| 2016/0337413 | A1* | 11/2016 | Sallam .................. G06F 16/433 |
| 2017/0171263 | A1 | 6/2017 | Cudak et al. |
| 2017/0236532 | A1* | 8/2017 | Reynolds ............... H04N 7/147 704/248 |
| 2018/0041451 | A1 | 2/2018 | Gibbs et al. |
| 2018/0060601 | A1* | 3/2018 | Kay ....................... H04W 4/33 |
| 2018/0122404 | A1* | 5/2018 | Hwang .................. G10L 15/26 |
| 2018/0226073 | A1* | 8/2018 | Hodge ................ G10L 15/1822 |
| 2019/0036975 | A1* | 1/2019 | Beckman ............ H04L 67/5683 |
| 2019/0052701 | A1* | 2/2019 | Rathod ................. H04L 67/535 |
| 2019/0075144 | A1* | 3/2019 | Broadworth .......... H04L 65/403 |

OTHER PUBLICATIONS

Mell et al., "The NIST Definition of Cloud Computing", NIST, Special Publication 800-145, Sep. 2011, 7 pages.

Vivek, "Automated Keyword Extraction from Articles using NLP", <https://medium.com/analytics-vidhya/automated-keyword-extraction-from-articles-using-nlp-bfd864f41b34>, Dec. 17, 2018, 18 pages.

Grimes, "Sentiment, emotion, attitude, and personality, via Natural Language Processing", Watson, <https://www.ibm.com/blogs/watson/2016/07/sentiment-emotion-attitude-personality-via-natural-language-processing/>, Jul. 8, 2016, 7 pages.

Sidana, "Top Five Emotion / Sentiment Analysis APIs for understanding user sentiment trends.", <https://medium.com/@Mandysidana/top-five-emotional-sentiment-analysis-apis-116cd8d42055>, May 20, 2017, 10 pages.

* cited by examiner

PROXIMITY BASED AUDIO COLLABORATION

BACKGROUND

Aspects of the present invention relate generally to audio collaboration and, more particularly, to systems and methods for proximity based audio collaboration.

Modern collaboration is often conducted using a conference call or web conference in which participants conduct a discussion.

SUMMARY

In a first aspect of the invention, there is a computer-implemented method including: defining, by a computer device, an audio collaborative environment; defining, by the computer device, an access control of the audio collaborative environment, wherein the access control comprises a geofence; receiving, by the computer device, a request from at least one user device to connect to the audio collaborative environment; determining, by the computer device, the at least one user device satisfies the access control; connecting, by the computer device, the at least one user device to an audio channel of the audio collaborative environment; recording, by the computer device, audio data transmitted on the audio channel by the at least one user device; storing, by the computer device, the audio data in a record; tagging, by the computer device, respective portions of the audio data in the record; and presenting, by the computer device, one of the respective portions of the audio data to a user based on the tagging.

In another aspect of the invention, there is a computer program product including a computer readable storage medium having program instructions embodied therewith. The program instructions are executable by a computer device to cause the computer device to establish a shared audio collaborative environment that includes access control based on a geofence perimeter for an area associated with the shared audio collaborative environment; persist conversations within the shared audio collaborative environment with one or more tags that provide contextual information for the persisted conversations; and recommend persisted conversations to one or more users based on the one or more tags.

In another aspect of the invention, there is system including a processor, a computer readable memory, and a computer readable storage medium. The system includes program instructions stored on the computer readable storage medium for execution by the processor via the computer readable memory, wherein the execution of the program instructions causes the computer device to: record first audio data from a first session of an audio collaborative environment that includes access control based on a geofence; store the first audio data in a record in persistent storage; record second audio data from a second session of the audio collaborative environment, wherein the second session is at a time different than the first session; store the second audio data in the record by appending the second audio data to an end of the first audio data in the record; automatically tag the record including the first audio data and the second audio data with keywords, tone categories, and sentiment categories; and recommend portions of the record for playback to a user based on one or more of the tags.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Aspects of the present invention relate generally to audio collaboration and, more particularly, to systems and methods for proximity based audio collaboration. Implementations of the invention provide an audio channel that is open to individuals that are inside a defined physical area and in which the conversations that occur on the audio channel are persisted for future listening. According to aspects of the invention, a system stores an ongoing record of audio data (e.g., conversations) recorded from a dedicated audio channel. In embodiments, the system modifies the stored record by appending new audio data to the end of the stored data each time that new audio data is recorded on the audio channel. In this manner, users may connect to the channel at different times, and the system maintains a time-sequenced record that includes audio data recorded from the channel each time a user connects to the channel and adds something to the conversation.

In embodiments, the system controls access to the channel based on a location of a user device attempting to connect to the channel. In one example, a geofence is defined, and the system permits a user device to access the channel when the user device location is within the geofence. In one embodiment, the system denies access to the channel based on a user device attempting to access the channel when the user device location is outside the geofence. In another embodiment, the system grants access to the channel based on a user device attempting to access the channel when the user device location is outside the geofence and when the same user device has previously accessed the channel from a location inside the geofence. In an example, the geofence includes an altitude component.

In further embodiments, the system adds tags to the audio data contained in the stored record, and a user controls playback of the audio data using the tags. In one example, the tags are added manually, e.g., via user input from a user interface. In another example, the system automatically adds the tags based on one or more of: user data (e.g., user name); system date and time that audio data was recorded on the channel; natural language processing; sentiment analysis; and tone analysis. According to further aspects of the invention, after tags are added to the audio data, the system permits a user to select a tag and then plays the audio data from the stored record associated with the selected tag. In additional aspects, after tags are added to the audio data, the system automatically makes a recommendation of a portion of the audio data, of the stored record, to a user based on one or more of the added tags. If the provides input to accept the suggestion, then then system plays the recommended portion of the audio data from the stored record.

Implementations of the invention provide an improvement for managing audio data in audio collaboration environments. To this end, implementations of the invention automatically generate tags for the stored audio data and permit a user to control playback of the audio data based on the tags, e.g., by receiving user input of a selected tag and replaying the audio data associated with the selected tag. Additionally, implementations of the invention automatically generate tags for the stored audio data and generate recommendations to users based on the tags. Implementations of the invention also employ methods that are inherently computer based, and that cannot be performed in the human mind, such as: device location determination using global positioning system (GPS); and natural language processing (NLP).

It should be understood that, to the extent implementations of the invention collect, store, or employ personal information provided by, or obtained from, individuals (for example, audio data) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
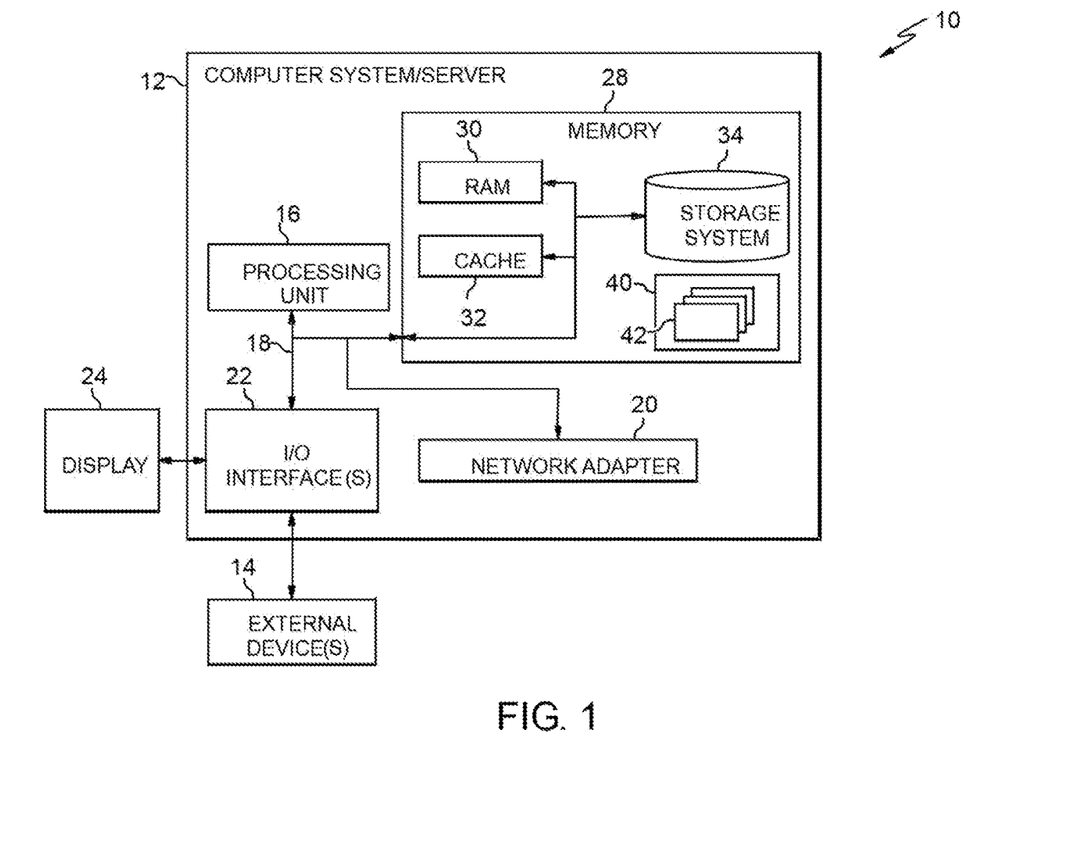
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
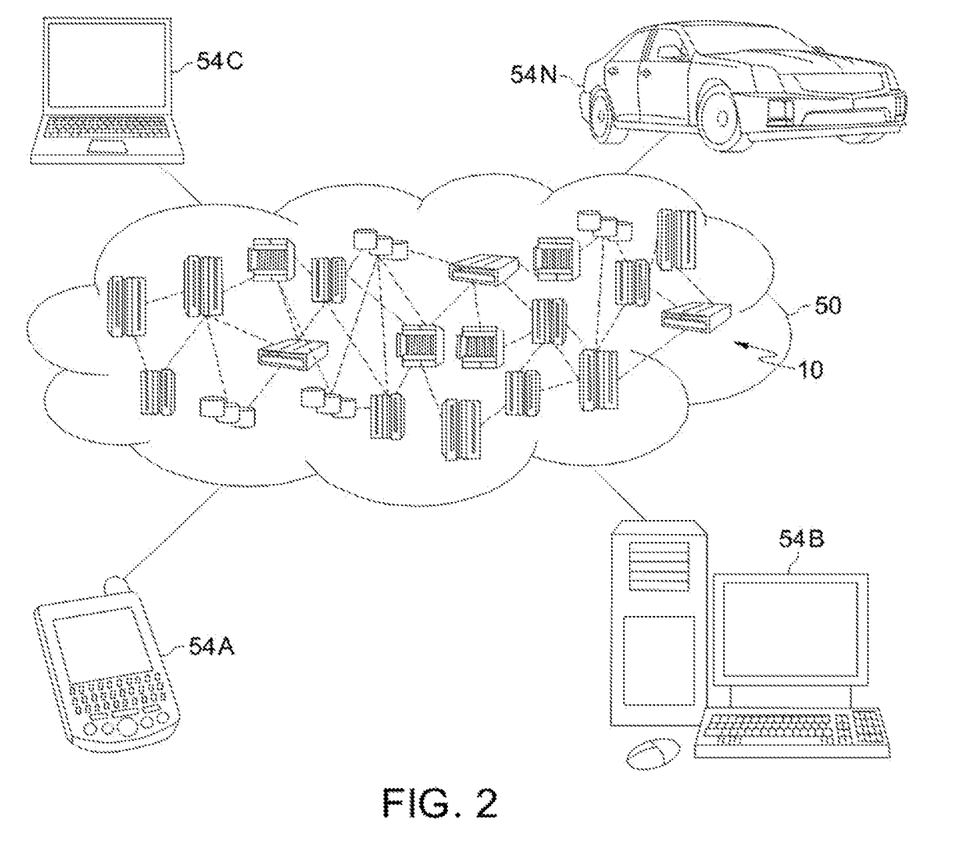
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
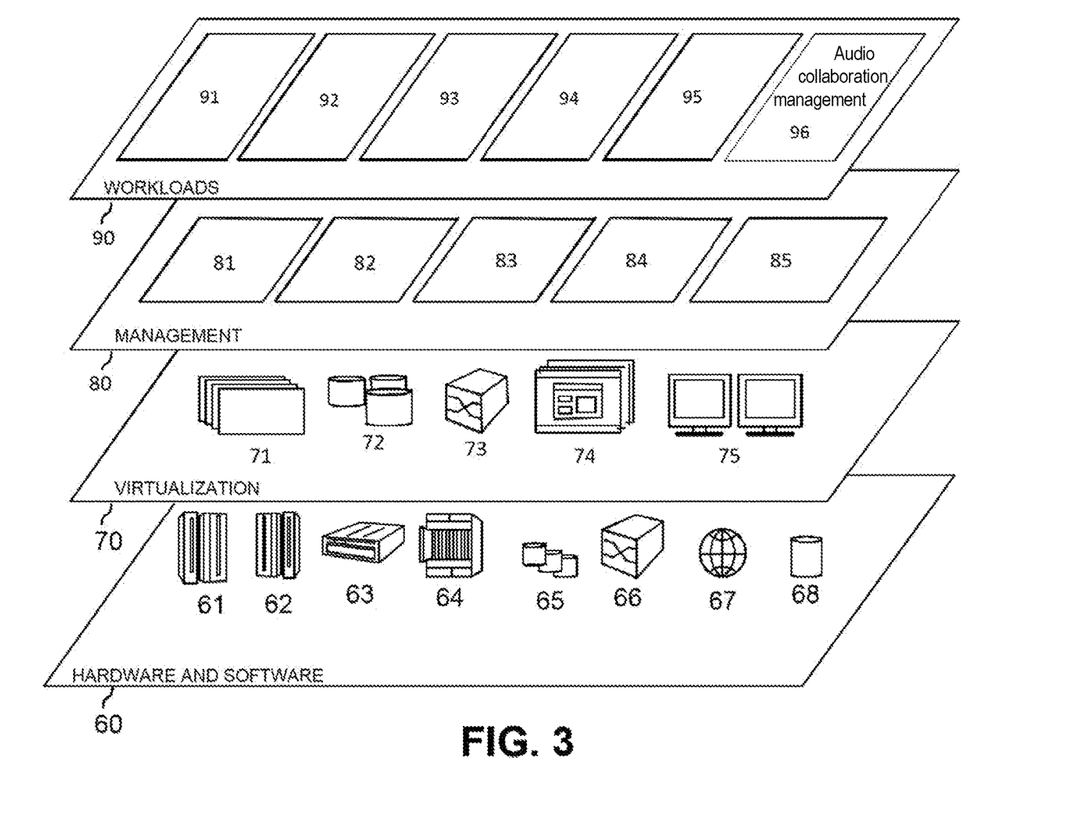
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio collaboration management 96.

Implementations of the invention may include a computer system/server 12 of FIG. 1 in which one or more of the program modules 42 are configured to perform (or cause the computer system/server 12 to perform) one or more functions of the audio collaboration management 96 of FIG. 3. For example, the one or more of the program modules 42 may be configured to: define an audio collaborative environment; define access control for the audio collaborative environment; receive and process a request to access the audio collaborative environment; persist audio data recorded in the audio collaborative environment; tag the audio data; and present the audio data for playback based on one or more of the tags.

Figure 4:
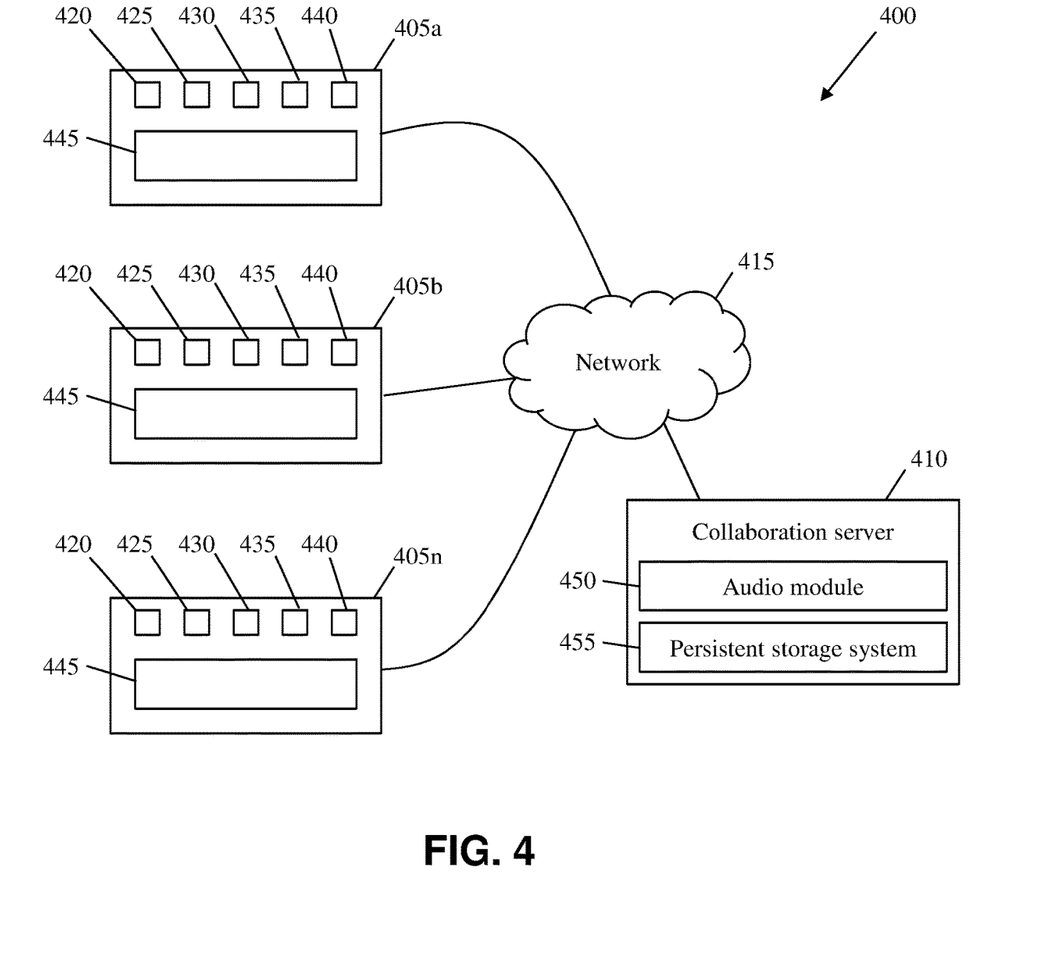
FIG. 4 shows a block diagram of an exemplary environment in accordance with aspects of the invention.

FIG. 4 shows a block diagram of an exemplary environment 400 in accordance with aspects of the invention. The environment includes user devices 405a, 405b, . . . , 405n and an collaboration server 410 all connected to a network 415. The network 415 may be any suitable communication network or combination of communication networks, such as a LAN, WAN, or the Internet. In implementations, the environment 400 comprises a distributed computing environment, such as the cloud computing environment 50 of FIG. 2, wherein the collaboration server 410 and the user devices 405a-n are nodes 10 in the cloud computing environment 50.

There may be any number "n" of user devices 405a-n. Each of the user devices 405a-n comprises a device that is configured to: participate in a telephone call or web conference via the network 415; and have its location determined using a computer based method. Examples of user devices 405a-n are smartphones, tablet computers, and laptop computers that comprise one or more elements of the computer system/server 12 of FIG. 1. In embodiments, each of the user devices 405a-n runs one or more application programs that provide an interface by which a user may enter data to be transmitted to the collaboration server 410. In a particular embodiment, each of the user devices 405a-n comprises: an audio speaker 420 configured to emit audio; a microphone 425 configured to receive audio; a computer processor 430; a location system 435 configured to determine a location of the user device; a communication system 440 configured to communicate with the network 415 via wired and/or wireless communication; and an input system 445 such as a keypad and/or touch screen display configured to receive user input. In embodiments, the location system 435 uses GPS to determine latitude, longitude and, optionally, altitude of the user device.

Still referring to FIG. 4 the collaboration server 410 is a computer device, such as computer system/server 12 of FIG. 1, that is configured to provide collaboration functions to the user devices 405a-n, e.g., in a client-server arrangement. For example, the collaboration server 410 may be configured to receive audio signals from any of the user device 405a-n that are connected to a channel defined by the collaboration server 410, and to generate and transmit respective audio signals to each of the other user devices 405a-n that are also currently connected to the channel. In this manner, when plural ones of the user devices 405a-n are connected to the channel, the collaboration server 410 performs audio conferencing (e.g., conference call) functions for the user devices that are connected.

Aspects of the invention are not limited to the collaboration server 410 handling only audio, and instead the collaboration server 410 may receive audio and video signals from any of the user devices 405a-n that are connected to a channel defined by the collaboration server 410, and generate and transmit respective audio and video signals to each of the other user devices 405a-n that are also currently connected to the channel. In this manner, the collaboration server 410 may function as a web conference server.

In implementations, the collaboration server 410 comprises an audio module 450 and a persistent storage system 455. In embodiments, the audio module 450 comprises one or more program modules 42 of FIG. 1 and is configured to perform one or more functions including: define an audio collaborative environment; define access control for the audio collaborative environment; receive and process a request to access the audio collaborative environment; persist audio data recorded in the audio collaborative environment; tag the audio data; and present the audio data for playback based on one or more of the tags. In embodiments, the persistent storage system 455 is a computer based storage system, such as storage system 34 of FIG. 1, that is configured to store the audio data recorded from the channel in a persistent manner.

In embodiments, the collaboration server 410 may each include additional or fewer components than those shown in FIG. 4. In embodiments, separate components may be integrated into a single computing component or module. Additionally, or alternatively, a single component may be implemented as multiple computing components or modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Devices of the environment 400 may interconnect via wired connections, wireless connections, or a combination of wired and wireless connections.

In accordance with aspects of the invention, the collaboration server 410 stores an ongoing record of audio data recorded from a dedicated audio channel to which the user devices 405a-n can connect. In embodiments, the collaboration server 410 stores the record in the persistent storage system 455 and modifies the record by appending new audio data to the end of the stored record each time that new audio data is recorded on the audio channel. For example, when plural user devices 405*a-n* are connected to the channel, the collaboration server 410 records the audio data of the plural users (e.g., the audio signals transmitted via the channel), and modifies the record stored in the persistent storage system 455 by adding this newly recorded audio data to the end of the record. Similarly, when only a single one of the user devices 405*a-n* is connected to the channel, the collaboration server 410 records the audio data of the single user (e.g., the audio signals transmitted via the channel), and modifies the record stored in the persistent storage system 455 by adding this newly recorded audio data to the end of the record. In this manner, one or more users may connect to the channel at different times, and the collaboration server 410 stores a time-sequenced record that includes audio data recorded from the channel each time at least one user connects to the channel and adds something to the conversation.

In embodiments, the collaboration server 410 controls access to the channel based on a location of a user device 405*a-n* attempting to connect to the channel. In one example, the collaboration server 410 stores data that defines a geofence and permits a user device 405*a-n* to connect to the channel based on a current location of the user device 405*a-n* being within the geofence, or alternatively based on the a current location of the user device 405*a-n* being outside the geofence and the same user device having previously connected to a the channel from a location within the geofence. In implementations, the location of the user device 405*a-n* is determined using the location system 435 of the user device, which utilizes one or more computer-based location techniques such as GPS, cell tower triangulation, etc. In one example, the geofence includes is defined by two-dimensional coordinates including latitude and longitude. In another example, the geofence includes is defined by three-dimensional coordinates including latitude, longitude, and altitude.

In further embodiments, the collaboration server 410 adds tags to the audio data contained in the stored record, and a user controls playback of the audio data using the tags. In one example, the tags are added manually, e.g., via user input from a user interface. In another example, the collaboration server 410 automatically adds the tags based on one or more of: user data (e.g., user name); system date and time that audio data was recorded on the channel; natural language processing; sentiment analysis; and tone analysis. According to further aspects of the invention, after tags are added to the audio data, the collaboration server 410 permits a user to select a tag and then plays the audio data (e.g., from the record stored in the persistent storage system 455) associated with the selected tag. In additional aspects, after tags are added to the audio data, the system automatically makes a recommendation of a portion of the audio data to a user based on one or more of the added tags.

Figure 5:
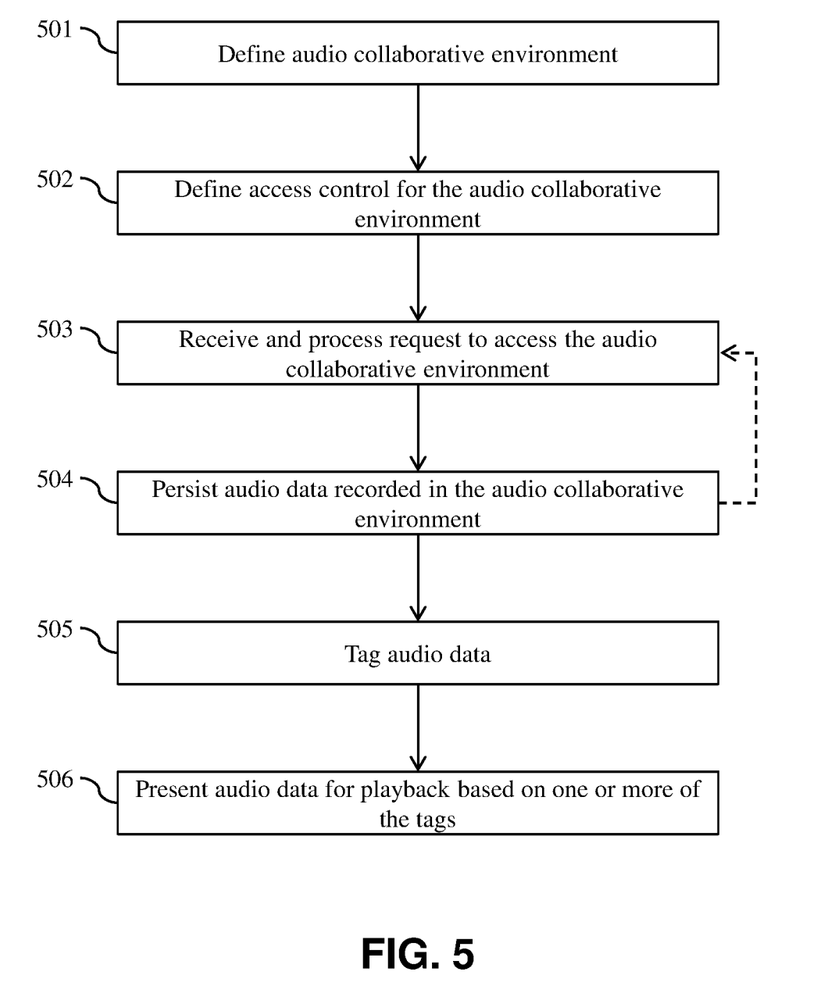
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the collaboration server 410 defines an audio collaborative environment. In embodiments, step 501 comprises the audio module 450 creating an audio collaborative environment including at least one audio channel that is accessed by a conference call telephone number (e.g., a bridge number) and/or a web conference address. In one example, the audio module 450 creates the audio collaborative environment in response to receiving a request from one of the user devices 405*a-n*. In this example, step 501 includes the audio module 450 transmitting data defining the audio channel (e.g., the telephone number and/or web address) to the user device that requested creation of the audio collaborative environment. As used herein, an audio collaborative environment refers to a conference call, a web conference, or another environment is which participants collaborate using computer-based audio signals. As used herein, an audio channel refers to a channel that transmits an audio signal in the audio collaborative environment.

In embodiments, step 501 also includes the audio module 450 defining, based on user input, one or more administrators that have authority to define access controls for the audio collaborative environment. The access controls are described herein at step 502. In one example, an administrator is a user that sent the request at step 501 to create the audio collaborative environment. This user may be determined, for example, via login credentials (e.g., username and password) and/or by user device identifier data (e.g., media access control address (MAC) address, etc.) of the user device used to send the request. The user that sent the request at step 501 to create the audio collaborative environment may also designate one or more other users as an administrator.

At step 502, the collaboration server 410 defines access controls for the audio collaborative environment created at step 501. In implementations, step 502 comprises the audio module 450 receiving user input from a user device 405*a-n* of an administrator (e.g., as defined at step 501), the input defining at least one of: a geofence; and conditions that must be satisfied to connect to the audio channel of step 501.

In embodiments, the audio module 450 defines the access controls by prompting an administrator to provide input to define a geofence. The geofence may be defined in a number of suitable ways. In one example, the geofence is defined by a central point and a radius that defines a circle around the central point, with all longitude and latitude pairs that fall within the circle being inside the geofence. In this example, the administrator provides user input that defines the central point and the radius. The user input that defines the central point may be: latitude and longitude typed into the device; latitude and longitude defined by a selection on a map; or latitude and longitude of the current location of the user device 405*a-n* of the administrator (e.g., determined by the location system 435 of the user device of the administrator).

In another example, the geofence is defined by a central point, a radius that defines a circle around the central point, a designated altitude, and an altitude range. In this example, the geofence includes all locations that satisfy the conditions: the location has a longitude and latitude pair within the circle; and the location is within the altitude range of the designated altitude. In this example, the administrator provides user input that defines the central point, the radius, the designated altitude, and the altitude range. The user input that defines the central point may be: latitude and longitude typed into the device; latitude and longitude defined by a selection on a map; or latitude and longitude of the current location of the user device 405*a-n* of the administrator (e.g., determined by the location system 435 of the user device of the administrator). The user input that defines the designated altitude may be: a height (e.g., above ground level (AGL) or height above mean sea level (AMSL)) entered into the device via user input; or a height (e.g., AGL or AMSL) of the current location of the user device 405*a-n* of the administrator (e.g., automatically determined by the location system 435 of the user device of the administrator). The user input that defines the altitude range may be: a number of feet or meters, or a number of floors (which the system then converts to feet or meters based on a stored definition for converting numbers of floors to feet or meters).

In another embodiment, the geofence is defined as locations within a predefined distance of one of the users. In this example, the system determines the location of one of the users (e.g., via the location determination system of this user's user device), and defines a geofence as a circle around the location of this user. The radius of the circle may be based on a predefined number stored in memory, the predefined number being a user-configurable setting.

Still referring to step 502, in embodiments, the audio module 450 defines the access controls by prompting an administrator to provide input to define a set of conditions that must be satisfied to connect to the audio channel. In one example of defining this set of conditions, the audio module 450 prompts the administrator to select one from the group consisting of: only user devices that are currently within the geofence; and user devices that (i) are currently within the geofence or (ii) are not currently within the geofence but have previously accessed the audio channel from within the geofence. In this example, the audio module 450 saves data defining the conditions in memory, and applies these conditions to determine whether to permit a user device to connect to the audio channel when subsequently receiving a request to connect to the audio channel.

At step 503, the collaboration server 410 receives and processes a request to access the audio collaborative environment defined at step 501. In implementations, step 503 comprises one of the user devices 405a-n attempting to connect to the audio channel using the telephone number and/or web address associated with the audio channel, as defined at step 501. For example, a user of user device 405a may dial the telephone number with the user device 405a. As another example, a user of user device 405b may enter the web address (or click or tap on a link of the web address) via an input module of the user device 405b. In embodiments, client software on the user device 405a-n is configured to transmit the current location of the user device 405a-n and a device identifier (e.g., MAC address) of the user device 405a-n to the collaboration server 410 as part of the request sent at step 503, the current location being determined from the location system 435.

Step 503 further comprises the audio module 450 determining, based on receiving the request from a user device 405a-n at step 503, whether to permit the requesting user device to connect to the audio channel. In embodiments, the audio module 450 performs this determining by comparing data associated with the request to the access controls defined at step 502. In the event that the access control limits access to only those user devices that are currently within the geofence, then the audio module 450 compares the current location of the user device that sent the request at step 503 to the geofence defined at step 502. If the current location of the user device is within the geofence, then the audio module 450 connects the user device the audio channel. For example, the audio module 450 connects the user device to the conference call or web conference. If the current location of the user device is not within the geofence, then the audio module 450 does not connect the user device to the audio channel.

In the event the access control is defined as user devices that (i) are currently within the geofence or (ii) are not currently within the geofence but have previously accessed the audio channel from within the geofence, then the audio module 450 compares the current location of the user device that sent the request at step 503 to the geofence defined at step 502. If the current location of the user device is within the geofence, then the audio module 450 connects the user device the audio channel. For example, the audio module 450 connects the user device to the conference call or web conference. If the current location of the user device is not within the geofence and the device identifier is stored in memory as a device that has previously accessed the audio channel from within the geofence, then the audio module 450 connects the user device the audio channel. For example, the audio module 450 connects the user device to the conference call or web conference. If the current location of the user device is not within the geofence and the device identifier is not stored in memory as a device that has previously accessed the audio channel from within the geofence, then the audio module 450 does not connect the user device to the audio channel.

At step 504, the collaboration server 410 persists audio data recorded in the audio collaborative environment defined at step 501. In implementations, step 504 comprises at least one user who is connected to the audio channel, via their respective user device 405a-n, providing audio input to the audio channel. The audio input is most commonly in the form of the user speaking into the microphone 425 of their user device 405a-n. The user device 405a-n receives the audio input via the microphone 425, converts the audio input to a signal, and transmits the signal to the collaboration server 410. If other users are also currently connected to the audio channel via their respective user devices 405a-n, then the collaboration server 410 transmits the signal to the other connected user devices 405a-n, which use their speaker 420 to convert the signal to sound that is output to the user.

Also at step 504, the audio module 450 stores data defining the signal in a record in the persistent storage system 455, and updates the record each time new audio data is recorded on the audio channel. For example, as described with respect to FIG. 4, when plural user devices 405a-n are connected to the channel, the audio module 450 records the audio data of the plural users (e.g., data defining the signals transmitted via the channel), and modifies the record stored in the persistent storage system 455 by adding this newly recorded audio data to the end of the record. Similarly, when only a single one of the user devices 405a-n is connected to the channel, the audio module 450 records the audio data of the single user (e.g., data defining the signals transmitted via the channel), and modifies the record stored in the persistent storage system 455 by adding this newly recorded audio data to the end of the record. In embodiments, the audio module 450 starts recording when conversation begins on the audio channel, e.g., using methods to detect when an audio signal is and is not present on the channel. In embodiments, the audio module 450 stops recording when the conversation ends (e.g., a user configurable predefined amount of time after the last detected audio signal) or when there are no longer any user devices 405a-n connected to the audio channel. By storing the audio data in the persistent storage system 455 in this manner, the system provides for future access (e.g., playback of the audio data of the stored record) by users who are outside of (not connected to) the collaborative environment.

As depicted by the dashed arrow in FIG. 5, steps 503 and 504 may repeat any number of times. In this manner, the system updates the stored record each time new audio data is communicated over the channel. In this manner, the stored record constitutes an ongoing recording of audio data communicate over the channel at different times. Moreover, it should be understood that different groups of users may connect at different iterations of step 503 for the same audio channel and same stored record. For example, a first group of three users might connect at a first time, and a second group of one user might connect at a second time. In this example, the system creates a stored record of the audio data of the conversation of the three users at the first time, and then at the second time the system appends the stored record by adding the audio data of the one user.

At step 505, the collaboration server 410 tags the audio data in the stored record (e.g., from step 504). In embodiments, step 505 comprises the audio module 450 adding tags (e.g., metadata) to portions the stored record. Numerous different types of tags are envisioned for use in implementations, including but not limited to: names of users; timestamps; keywords; sentiment; and tone. The tagging may be automated and/or manual.

In an example of automated tagging corresponding to names of users and timestamps, the system (e.g., the audio module 450) determines which user is speaking on the audio channel at any particular time, and tags that portion of the audio data with the speaking users name, which may be determined based on the login credentials the user employs when connecting to the audio channel. In a similar manner, the system may also tag each portion of the audio data with a timestamp (e.g., date and time of that the audio data is recorded on the audio channel). In a similar manner, the system may also tag each portion of the audio data with the names of all users that were connected to the audio channel when the audio data was recorded, which is useful in determining which users are present and which are absent when certain comments were made.

In an example of automated tagging corresponding to one or more of keywords, sentiment, and tone, the system (e.g., the audio module 450) utilizes cognitive analysis techniques to determine one or more of keywords, sentiment, and tone associated with discrete portions of the audio data of the stored record, and then tags the portions with the determined one or more of keywords, sentiment, and tone. Categories of sentiment determined by the system may include, for example and without limitation, very positive, positive, mixed, negative, very negative, and neutral. In embodiments, discrete portions of the audio data are tagged with one or more of these sentiment categories based on the sentiment analysis performed by the system. Categories of tone determined by the system may include, for example and without limitation, anger, disgust, fear, joy, sadness, analytical, confident, tentative, openness, conscientiousness, extraversion, and agreeableness. In embodiments, discrete portions of the audio data are tagged with one or more of these tone categories based on the tone analysis performed by the system. The analysis can also include keyword identification (also called keyword extraction) performed using natural language processing (NLP), and discrete portions of the audio data may be tagged with one or more of the determined keywords based on the analysis performed by the system.

In one example, the system analyzes the audio data of the stored record (from step 504) to determine tags for one or more of keywords, sentiment, and tone. In another example, the system converts the audio data of the stored record to text data, e.g., using a speech text tool, and analyzes the text data to determine tags for one or more of keywords, sentiment, and tone. Computer-based sentiment analysis and tone analysis techniques for each of text data and audio data are understood such that further explanation is not believed necessary.

In one example, the audio module 450 performs the one or more of sentiment analysis, tone analysis, and keyword extraction. In another example, the audio module 450 accesses another program module or computer device using an application program interface (API) call. In this example, the other program module or computer device performs the one or more of sentiment analysis, tone analysis, and keyword extraction, and returns the determined tags to the audio module 450 in response to the API call. In embodiments, the audio module 450 stores the determined tags in the persistent storage system 455 with the stored record of the audio data to facilitate playback of the audio data, using the tags to control the playback, at a later time.

Still referring to step 505, in an example of manual tagging, the system (e.g., the audio module 450) receives user input from one of the user devices 405*a-n* and stores a tag in the persistent storage system 455 with the stored record of the audio data based on the user input. In one example, as described herein with respect to FIG. 6, a user interface displayed on the user device contains a field in which a user may manually type the text of a tag to be applied to a discrete portion of the audio data. In this manner, the system permits the users to define and apply their own tags to the stored record of the audio data.

At step 506, the collaboration server 410 presents the audio data (from step 504) for playback based on one or more of the tags (from step 505). In embodiment, step 506 comprises the audio module 450 communicating with a user device 405*a-n* to cause a display of the user device to display a user interface that permits a user to search for text in the tags. The system searches the tags (from step 505) based on the user input received via the user interface to determine tags that satisfy the user input. The system displays the search results in the user interface in a manner that permits the user to select one of the search results. Based upon receiving the user selection of one of the search results, the system causes the user device 405*a-n* to play the portion of the audio data of the stored record that corresponds to the selected tag. For example, in response to receiving a selection of a search result via the user interface, the audio module 450 transmits the respective portion of the audio data to the user device 405*a-n*, which then outputs the portion of the audio data via the speaker 420. In this manner, the user may selectively play back certain portions of the audio data based on the tags.

In further embodiments, step 506 additionally or alternatively comprises the audio module 450 presenting a suggestion to a user via the user interface of the user device 405*a-n*. In one example of an automated suggestion, the system determines that a discrete portion of the audio data of the stored record refers to a user who was not connected to the audio channel when the portion of the audio data was recorded. For example, by analyzing tags corresponding to user names that were connected when the portion of the audio data was recorded, and by analyzing keyword tags that identify names spoken in the portion of the audio data, the system determines that a particular user's name is spoken in a portion of the audio data when that user (whose name was spoken) was not connected to the audio channel. In this example, the system automatically presents a recommendation to the user (whose name was spoken) via the user interface of a user device 405*a-n*. In response to receiving an acceptance of the recommendation via the user interface, the audio module 450 transmits the respective portion of the audio data to the user device 405*a-n*, which then outputs the portion of the audio data via the speaker 420. In this manner, the user may selectively play back the portions of the audio data that is of interest to them.

In another example of an automated suggestion, in embodiments the system (e.g., the audio module) uses machine learning to analyze how different users consume (e.g., typically playback) portions of the audio data of the stored record. In one example, the system uses analyzes each users playback history to determine which specific tags or types of tags each user selects the most often when searching and playing back audio data of the stored record. Based on this determining, the system automatically suggests certain tagged portions of the audio data to a user, which can eliminate the need for the user to manually search the tags as previously described. In embodiment, the system infers positive and negative feedback regarding the suggested tags and updates its analysis for this user based on the feedback, e.g., via machine learning. An example of positive feedback is when the system presents suggested tags and the user selects one of the suggested tags. An example of negative feedback is when the system presents suggested tags and the user does not select any of the suggested tags, but instead performs a manual search as described herein.

At step 506, the playback portion of the audio data may be downloaded to the user device, e.g., as a file, or may be streamed. In embodiments, step 506 also includes the system performing an access control validation check to verify that a user attempting to access the stored record (from step 504) is authorized to access the stored record.

Figure 6:
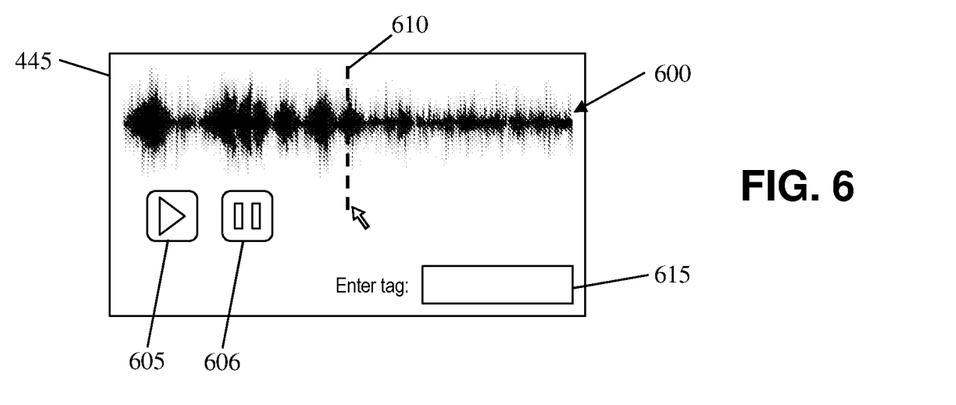
FIGS. 6-8 show exemplary user interfaces in accordance with aspects of the invention.
Figure 7:
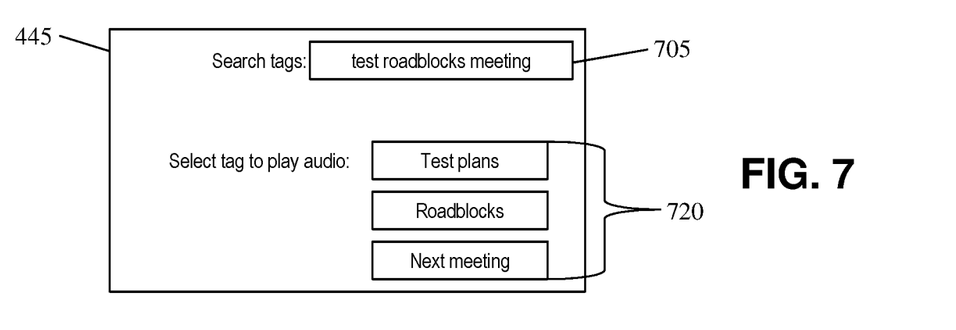
Figure 8:
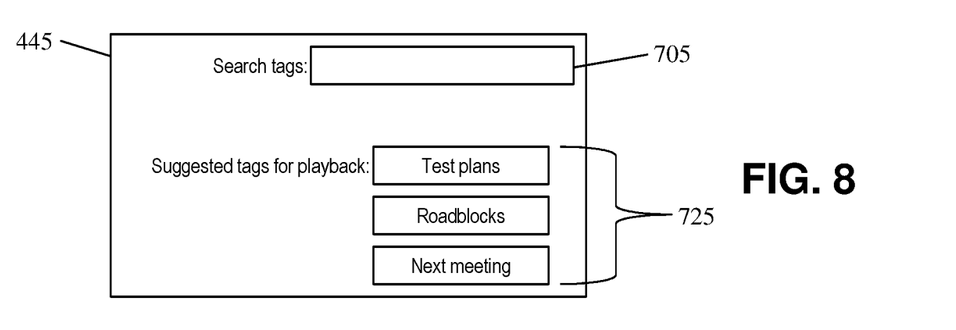

FIGS. 6-8 show exemplary user interfaces in accordance with aspects of the invention. Aspects and functionality of the user interfaces are described with reference to elements depicted in FIG. 4 and steps of the method of FIG. 5.

FIG. 6 shows an example of a user interface displayed on the display 445 of a user device 405*a-n*. The user interface in FIG. 6 is one that permits a user to manually define a tag for a portion of the audio data of the stored record, e.g., as described with respect to step 505. In embodiments, the user interface includes a visual representation 600 of the audio data of the stored record (saved at step 504) and controls 605 and 606 for controlling playback of the audio data. In this example, 605 is play button and 606 is a pause button, although additional and/or different audio playback controls may be provided. The user interface also includes a visual representation of the current location 610 of the playback in the visual representation 600 of the audio data. The user interface also includes a field 615 by which the user can input text to define a tag that the system will save is association with the portion of the audio data at the current location 610. In embodiments, the user can designate how much of the audio data is to be tagged with the tag input at the field 615, for example by designating an amount of time after or around the current location 610.

FIG. 7 shows an example of another user interface displayed on the display 445 of a user device 405*a-n*. The user interface in FIG. 7 is one that permits a user search for tags, e.g., as described with respect to step 506. In embodiments, the user interface includes a field 705 in which the user can enter a search string, e.g., text. In this example, the user has typed the search string "test roadblocks meeting" in the field 705. Based on this search string, the system searches the tags stored with the audio data of the stored record and displays search results 720 (e.g., of result tags that match/satisfy the search string) in the user interface. The search results 720 may be ranked in or der of a determined search confidence value, for example. The user may then select one of the search results 720 to play back the portion of the audio data of the stored record that corresponds to the one of the search results.

FIG. 8 shows an example of another user interface displayed on the display 445 of a user device 405*a-n*. The user interface in FIG. 8 is one that includes automated suggestions for playback based on tags, e.g., as described with respect to step 506. In embodiments, the user interface includes the field 705 in which the user can enter a search string. In this example, before the user has typed a search string into the field 715, the system displays suggested tags 725 in the user interface. As described above with respect to FIG. 5, the suggested tags may be determined using machine learning, e.g., by analyzing this user's playback patterns and feedback for specific tags or types of tags that are most often used for playback. The user may then select one of the suggested tags 725 to play back the portion of the audio data of the stored record that corresponds to the one of the suggested tags.

As should be understood from the description herein, implementations of the invention provide a computer-implemented method comprising: establishing a shared audio collaborative environment that includes access control based on a geofence perimeter for an area associated with the shared audio collaborative environment (e.g., as described in aspects of steps 501, 502); persisting conversations within the shared audio collaborative environment with one or more tags that provide contextual information for the persisted conversations (e.g., as described in aspects of steps 503, 504, 505, and at FIG. 6); and recommending persisted conversations to one or more users either in the shared audio collaborative environment or out of the shared audio collaborative environment based on the one or more tags (e.g., as described in aspects of step 506, and at FIG. 8). In an embodiment, the establishing a shared audio collaborative environment that includes access control based on a geofence perimeter for an area associated with the shared audio collaborative environment comprises creating a bridge number and defining users having authority to define access controls (e.g., as described in aspects of step 501). In one example, the method further comprises defining an area for the shared collaborative environment with respect to physical distance between users in an area or using global positioning system (GPS) and altitude parameters (e.g., as described in aspects of step 502). In an example, the persisting conversations within the shared audio collaborative environment with one or more tags that provide contextual information for the persisted conversations comprises: recording audio content presented in the shared audio collaborative environment; storing the recorded audio content; and generating one or more tags for each detected conversation and each detected participant of respective conversations in the recorded audio content using natural language processing and sentiment analysis (e.g., as described in aspects of steps 503, 504, 505).

As should be understood from the description herein, implementations of the invention provide a computer-implemented method comprising: recording first audio data from a first session of an audio collaborative environment that includes access control based on a geofence (e.g., as described in aspects of steps 501, 502, 503); storing the first audio data in a record in persistent storage (e.g., as described in aspects of steps 503, 504); recording second audio data from a second session of the audio collaborative environment (e.g., as described in aspects of steps 501, 502, 503); store the second audio data in the record by appending the second audio data to an end of the first audio data in the record (e.g., as described in aspects of steps 503, 504); automatically tag the record that includes the first audio data and the second audio data with keywords, tone categories, and sentiment categories (e.g., as described in aspects of step 505); and recommend portions of the record for playback to a user based on one or more of the tags (e.g., as described in aspects of step 506 and at FIG. 8).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
defining, by a computer device, an audio collaborative environment;
defining, by the computer device, an access control of the audio collaborative environment, wherein the access control comprises a geofence, wherein the geofence is defined by three-dimensional coordinates including latitude, longitude, and altitude;
receiving, by the computer device, a request from at least one user device to connect to the audio collaborative environment wherein the request includes a location of the at least one user device;
determining, by the computer device, the at least one user device satisfies the access control;
connecting, by the computer device, the at least one user device to an audio channel of the audio collaborative environment;
recording, by the computer device, audio data transmitted on the audio channel by the at least one user device;
storing, by the computer device, the audio data in a record;
tagging, by the computer device, respective portions of the audio data in the record based on natural language processing; and
presenting, by the computer device, one of the respective portions of the audio data to a user based on the tagging.

2. The method of claim 1, wherein:
the request includes a location of the user device; and
the satisfying the access control comprises the computer device determining the location of the user device is inside the geofence.

3. The method of claim 1, wherein:
the request includes a location of the user device; and
the satisfying the access control comprises the computer device determining the location of the user device is outside the geofence and the user device has previously connected to the audio channel from a location inside the geofence.

4. The method of claim 1, wherein the tagging comprises:
receiving user input defining a tag; and
storing the tag with the audio data.

5. The method of claim 1, wherein the tagging comprises automatically tagging the audio data with user names of users connected to the audio channel and a timestamp.

6. The method of claim 1, wherein the tagging comprises automatically tagging the audio data with keywords.

7. The method of claim 1, wherein the presenting comprises:
determining suggested tags for a user using machine learning;
causing the suggested tags to be displayed in a user interface of a playback user device;
receiving a selection of one of the suggested tags; and
transmitting a portion of the audio data associated with the selected one of the suggested tags to the playback user device to be played on a speaker of the playback user device.

8. The method of claim 1, wherein the presenting comprises:
receiving user input of a search string via a user interface of a playback user device;
determining result tags that satisfy the search string;
causing the result tags to be displayed in the user interface;
receiving a selection of one of the result tags; and
transmitting a portion of the audio data associated with the selected one of the result tags to the playback user device to be played on a speaker of the playback user device.

9. The method of claim 1, wherein the at least one user device comprises plural user devices participating in a conference call or web conference,
the computer device records and stores audio data from the plural user devices during the conference call or web conference, and
the tagging the respective portions of the audio data in the record is based on user data, system date and time that the respective portions of the additional audio data were recorded on the channel, natural language processing, sentiment analysis, and tone analysis,
the method further comprising:
disconnecting the plural user devices from the audio channel;
after the disconnecting, receiving another request from another at least one user device to connect to the audio collaborative environment;

determining, by the computer device, the another at least one user device satisfies the access control;

connecting, by the computer device, the another at least one user device to the audio channel of the audio collaborative environment;

recording, by the computer device, additional audio data transmitted on the audio channel by the another at least one user device;

storing, by the computer device, the additional audio data in the record, wherein the storing comprises appending the additional audio data to the audio data already present in the record;

tagging, by the computer device, respective portions of the additional audio data in the record, wherein the tagging is based on user data, system date and time that the respective portions of the additional audio data were recorded on the channel, natural language processing, sentiment analysis, and tone analysis; and outputting, by the computer device, at least one of the respective portions of the audio data and at least one of the respective portions of the additional audio data to a user based on the tagging.

10. The method of claim 1, further comprising verifying, prior to the presenting, that a user requesting playback is authorized to access the record.

11. The method of claim 1, wherein:

the at least one user device comprises plural user devices participating in a conference call or web conference; and the computer device records and stores audio data from the plural user devices during the conference call or web conference.

12. The method of claim 1, wherein:

the at least one user device comprises only a single user device; and the computer device records and stores audio data from the single user device.

13. A computer program product, the computer program product comprising a computer readable storage medium having program instructions embodied therewith, the program instructions executable by a computer device to cause the computer device to:

establish a shared audio collaborative environment that includes access control based on a geofence perimeter for an area associated with the shared audio collaborative environment;

receive, by the computer device, a request from a user device to connect to the audio collaborative environment;

determine, by the computer device, the user device satisfies the access control;

connect, by the computer device, the at least one user device to an audio channel of the audio collaborative environment;

persist conversations within the shared audio collaborative environment with one or more tags, based on natural language processing, that provide contextual information for the persisted conversations; and recommend persisted conversations to one or more users based on the one or more tags, and wherein the request includes a location of the user device; and the satisfying the access control comprises the computer device determining either that the location of the user device is inside the geofence, or the location of the user device is outside the geofence and the user device has previously connected to the audio channel of the audio collaborative environment from a location inside the geofence.

14. The computer program product of claim 13, wherein the establishing comprises creating a bridge number and defining users having authority to define access controls.

15. The computer program product of claim 14, wherein the program instructions cause the computer device to define an area for the shared collaborative environment with respect to physical distance between users in an area or using global positioning system (GPS) and altitude parameters.

16. The computer program product of claim 13, wherein the persisting comprises:

recording audio content presented in the shared audio collaborative environment;

storing the recorded audio content; and generating one or more tags for each detected conversation and each detected participant of respective conversations in the recorded audio content using natural language processing and sentiment analysis.

17. A system comprising:

a computer device comprising a processor, a computer readable memory, and a computer readable storage medium; and program instructions stored on the computer readable storage medium for execution by the processor via the computer readable memory, wherein the execution of the program instructions causes the computer device to:

record first audio data from a first session of an audio collaborative environment that includes access control based on a geofence, wherein the geofence is defined with respect to physical distance between users in an area or using global positioning system (GPS);

store the first audio data in a record in persistent storage;

record second audio data from a second session of the audio collaborative environment, wherein the second session is at a time different than the first session;

store the second audio data in the record by appending the second audio data to an end of the first audio data in the record;

automatically tag the record including the first audio data and the second audio data with keywords, tone categories, and sentiment categories; and recommend portions of the record for playback to a user based on one or more of the tags.

18. The system of claim 17, wherein the tagging comprises:

determining the keywords using natural language processing;

determining the tone categories using tone analysis; and determining the sentiment categories using sentiment analysis.

19. The method of claim 1, wherein the tagging comprises automatically tagging the audio data with sentiment categories.

20. The method of claim 1, wherein the tagging comprises automatically tagging the audio data with tone categories.

* * * * *